United States Patent [19]

Archer et al.

[11] Patent Number: 5,660,802

[45] Date of Patent: Aug. 26, 1997

[54] WATER PURIFIER

[75] Inventors: David D. Archer, Wakefield, R.I.; Diane M. Brancazio, Cambridge; Susannah E. Gardner, Brookline, both of Mass.; Charles F. Heinig, Jr., Providence, R.I.; Matthew D. Hern, Boston, Mass.; Francis M. Lubrano, Narragansett; David A. Snow, Barrington, both of R.I.; David M. Sykes, Cambridge, Mass.

[73] Assignee: Fountainhead Technologies, Inc., Providence, R.I.

[21] Appl. No.: 439,214

[22] Filed: May 11, 1995

Related U.S. Application Data

[63] Continuation-in-part of Ser. No. 334,062, Nov. 4, 1994, abandoned, which is a continuation-in-part of Ser. No. 255,178, Jun. 7, 1994, abandoned.

[51] Int. Cl.$^6$ .................................................. B01D 11/02
[52] U.S. Cl. ........................ 422/261; 137/268; 210/764; 422/263; 422/271
[58] Field of Search ............................ 422/261, 263, 422/276, 282; 210/764, 169, 206, 501; 137/268, 845, 849

[56] References Cited

U.S. PATENT DOCUMENTS

| | | | |
|---|---|---|---|
| 2,989,979 | 6/1961 | Karlson | 137/268 |
| 3,433,580 | 3/1969 | Deuringer | 423/219 |
| 3,702,298 | 11/1972 | Zsoldos, Jr. et al. | 210/754 |
| 3,912,626 | 10/1975 | Ely et al. | 210/710 |
| 3,929,151 | 12/1975 | Rubin | 422/261 |
| 4,007,118 | 2/1977 | Ciambrone | 210/760 |
| 4,029,578 | 6/1977 | Turk | 210/760 |
| 4,040,336 | 8/1977 | Basilia et al. | 502/336 |
| 4,092,245 | 5/1978 | Franks et al. | 210/764 |
| 4,116,859 | 9/1978 | Merkl | 417/384 |
| 4,379,778 | 4/1983 | Dalton, Jr. et al. | 423/584 |
| 4,393,038 | 7/1983 | Sun et al. | 423/584 |
| 4,492,618 | 1/1985 | Eder | 204/152 |
| 4,504,387 | 3/1985 | Lemire et al. | 210/101 |
| 4,579,104 | 4/1986 | Snavely | 137/845 |
| 4,608,247 | 8/1986 | Heinig, Jr. | 424/421 |
| 4,620,648 | 11/1986 | Schwartzman | 137/845 |
| 4,662,387 | 5/1987 | King, Sr. | 137/268 |
| 4,680,114 | 7/1987 | Hayes | 210/192 |
| 4,690,305 | 9/1987 | Copeland | 222/52 |
| 4,751,005 | 6/1988 | Mitsui et al. | 210/759 |
| 4,784,765 | 11/1988 | Cohen | 210/169 |
| 4,935,116 | 6/1990 | Lemire | 204/237 |
| 5,011,600 | 4/1991 | Mowka, Jr. et al. | 210/169 |
| 5,053,206 | 10/1991 | Maglio et al. | 422/276 |
| 5,076,315 | 12/1991 | King | 422/282 |
| 5,130,033 | 7/1992 | Thornhill | 210/754 |
| 5,145,587 | 9/1992 | Ishii et al. | 210/759 |
| 5,192,452 | 3/1993 | Mitsui et al. | 210/760 |
| 5,217,626 | 6/1993 | Yahya et al. | 210/764 |
| 5,222,522 | 6/1993 | Rontome | 137/845 |
| 5,352,369 | 10/1994 | Heining, Jr. | 210/501 |
| 5,396,925 | 3/1995 | Poli | 137/845 |
| 5,404,594 | 4/1995 | Ring et al. | 422/261 |
| 5,447,641 | 9/1995 | Wittig | 422/261 |

*Primary Examiner*—Timothy McMahon
*Attorney, Agent, or Firm*—Kilpatrick Stockton LLP

[57] ABSTRACT

A water purifier for killing bacteria in water located in a confined area includes a water inlet, a water outlet, and a purification unit that kills the bacteria in the water. A first fluid path is located between the water inlet and the water outlet so that water flowing along the first fluid path flows from the water inlet to the water outlet without passing through the purification unit, and includes a constricted region that has a cross sectional area that is smaller than a cross sectional area of the water inlet. A second fluid path is located between the water inlet and the water outlet, and includes the purification unit, so that water flowing along the second fluid path flows through the purification unit as the water flows from the water inlet to the water outlet. A self-adjusting flow regulator is positioned in the constricted region to automatically modify the cross sectional area of the constricted region to maintain a rate of flow along the second fluid path within a predetermined range as a combined rate of flow along the first and second fluid paths varies.

15 Claims, 9 Drawing Sheets

5,660,802

WATER PURIFIER

CROSS-REFERENCE TO RELATED APPLICATIONS

This application is a continuation-in-part of U.S. patent application Ser. No. 08/334,062, filed Nov. 4, 1994, now abandoned, which in turn is a continuation-in-part of U.S. patent application Ser. No. 08/255,178, filed on Jun. 7, 1994, now abandoned.

BACKGROUND OF THE INVENTION

The invention relates to a water purifier for treating water to kill substantially all of the bacteria therein.

Water must be effectively treated before it can be utilized in confined bodies of water, such as swimming pools, hot tubs and spas. In this regard, it is well recognized that swimming pools, hot tubs and spas are highly susceptible to rapid microorganism growth and that they can quickly become extremely hazardous to users thereof unless the water is effectively and continuously treated against microorganisms.

The most common method of treating confined bodies of water against microorganisms to render the water safe for use is to add chlorine (normally in the form of a hypochlorite salt or chlorine gas) to the water. However, it has been found that chlorine has an objectionable odor and can cause skin irritations and serious eye irritations to users of the confined bodies of water.

In recent years, because of the objectionable physical properties of chlorine, alternative water treatment systems that operate without chlorine have been developed. One effective alternative water treatment system is a system in which silver ions are added to the water to kill bacteria therein. In this regard, the applicant's prior U.S. Pat. No. 4,608,247, which is incorporated herein by reference, discloses an exemplary system of this general type.

SUMMARY OF THE INVENTION

In one aspect, generally, the invention features a water purifier for killing bacteria in water located in a confined area. The water purifier, which operates without chlorine, includes a water inlet, a water outlet, and a purification unit that kills the bacteria in the water. Water entering the water inlet can flow along either a first path or a second path. The first path allows the water to flow from the water inlet to the water outlet without passing through the purification unit, while the second path forces the water to pass through the purification unit. The amounts of water flowing along the paths vary relative to each other so that substantially equal pressures are maintained in the two paths. The use of two paths simply and efficiently controls the amount of water flowing through the purification unit, and thereby allows the water purifier to operate effectively over a range of flow rates.

To ensure that an appropriate portion of the water entering the water inlet passes through the purification unit, the first path includes a constricted region having a cross sectional area that is smaller than a cross sectional area of the water inlet. The constricted region causes a pressure increase in the first path, and thereby forces at least some of the water to travel along the second path. A self-adjusting flow regulator is positioned in the constricted region to automatically modify the cross sectional area of the constricted region to maintain a rate of flow along the second fluid path within a predetermined range as a combined rate of flow along the first and second fluid paths varies.

Preferred embodiments include one or more of the following features. First, to further ensure sufficient flow along the second path, the purification unit has a cross sectional area that is larger than a cross sectional area of the water inlet. Typically, the second path is configured so that water flows in a downward direction from the purification unit to the water outlet. This increases the likelihood that materials added to the water by the purification unit will flow out of the water purifier, and will not settle in the bottom of the water purifier (as could occur if water flowed up from the purification unit). With the purification unit vertically oriented, water flows in an upward direction through the purification unit. To prevent high velocity water from damaging purification materials in the purification unit, the water purifier also includes a diffuser positioned between the water inlet and the purification unit.

The water inlet and water outlet are incorporated into a body to which is connected a cover that houses the purification unit. This cover is removable for replacement of the purification unit, which is typically a cartridge containing a silver catalyst. The silver catalyst includes an aluminum matrix having elemental silver chemically deposited thereon. Prior to use, the matrix with the silver thereon is heated to between approximately 750° C. and 1050° C.

The housing may include one or more keying mechanisms to control whether a particular cartridge may be inserted into a particular water purifier. In this case, the cartridge will include one or more sockets configured to interlock with the keying mechanisms. Use of the sockets and keying mechanisms is advantageous in that they permit the water purifier and cartridges appropriate to the water purifier to be identified according to criteria such as, for example, climate, pool capacity, water conditions, general level of use and pool or purifier manufacturer (i.e., for warranty purposes). They keying mechanisms permit only a cartridge that is designated for use with a housing to be inserted into the housing.

The water purifier may also include an indicator for indicating the rate at which water is flowing through the purification unit. In this case, the cover of the water purifier may include a transparent top and the indicator may be implemented using one or more movable objects that are positioned beneath the transparent top and are moved by water flowing through the purification unit. Thus, the rate at which water is flowing through the purification unit may be observed by observing the movement of the objects.

In addition, the water purifier may include a shutoff valve configured to shut off flow through the second fluid path without reducing flow through the first fluid path. The shutoff valve would be used, for example, to permit replacement of the cartridge while water is flowing through the water purifier. Typically, the shutoff valve includes an inner sleeve having a first opening through which water enters the second fluid path and a second opening through which water exits the second fluid path, and an outer sleeve positioned around the inner sleeve and rotatable relative to the inner sleeve, where rotation of the outer sleeve relative to the inner sleeve shuts off flow along the second fluid path.

In another aspect, generally, the invention features a purification cartridge designed to fit in the housing of a water purifier. The cartridge includes a first end having a hole therein through which water enters the cartridge, a second end having a hole therein through which water exits the cartridge, a central chamber between the first and second ends, a diffuser positioned between the hole in the first end and the central chamber, and a purification material for killing microorganisms (e.g., a catalyst such as a silver catalyst) positioned in the central chamber so that water flowing through the water purifier flows through the silver catalyst as the water passes from the first end to the second end. As discussed above, when the housing includes a keying mechanism, the cartridge includes a socket configured to interlock with the keying mechanism. A preferred catalyst is an aluminum matrix having elemental silver chemically deposited thereon. Prior to use, the matrix with the silver thereon is heated to between approximately 750° C. and 1050° C. "First end", as used herein, means the first end surface and the approximately 10 percent of the sidewall portion of the cartridge adjacent the first end surface. "Second end", as used herein, means the second end surface and the approximately 10 percent of the sidewall portion of the cartridge adjacent the second end surface.

Other advantages and features will become apparent from the following description and from the claims.

DESCRIPTION OF THE PREFERRED EMBODIMENTS

For ease of description and understanding, the following description will refer to the embodiments of the water purifier as being connected to a swimming pool. However, it should be understood that the embodiments could also be connected to hot tubs, spas, fountains, wading pools, or to any other confined body of water for which prevention of the growth of microorganisms is desirable.

Figure 1:
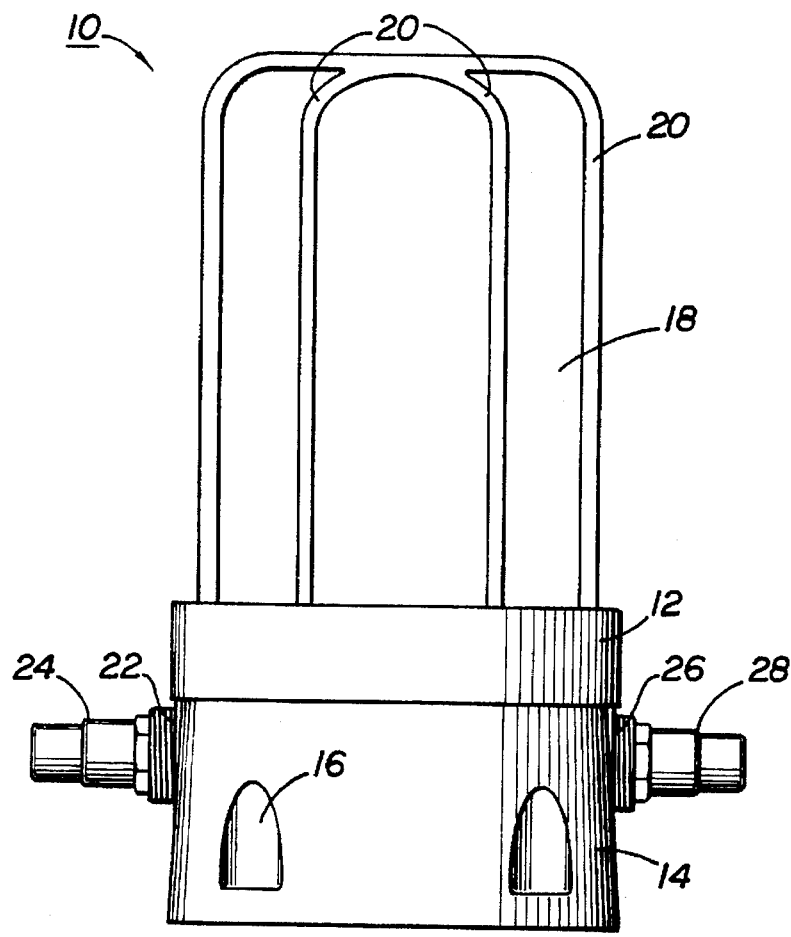
FIG. 1 is a side view of a first water purifier.
Figure 2:
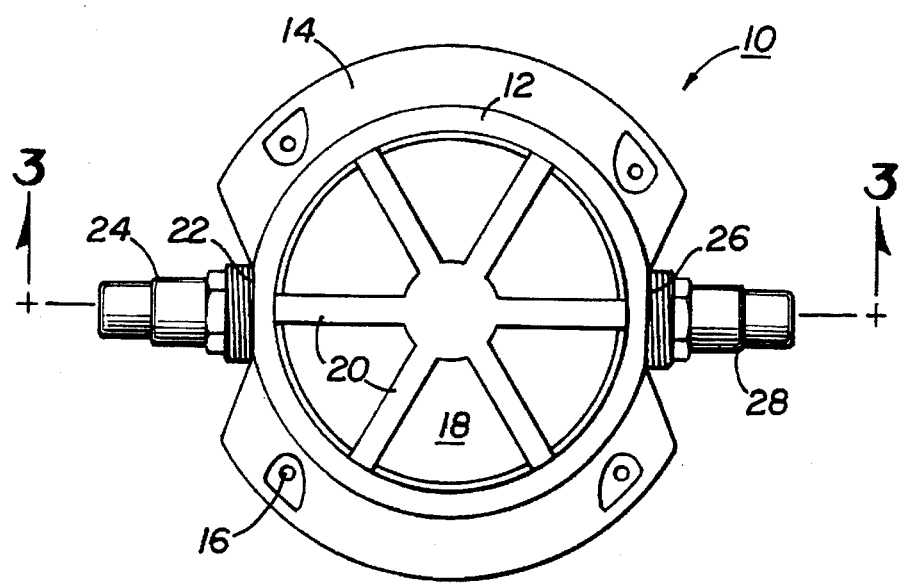
FIG. 2 is a top view of the water purifier of FIG. 1.

Referring to FIGS. 1 and 2, one embodiment of a water purifier 10 includes a body 12 to which a base 14 is permanently secured. The base includes four mounting holes 16 for rigidly securing the water purifier to a solid, stable base. Typically, the body and base are made from plastic, and, to eliminate any need for separate fasteners, are secured to each other through an interference fit.

As discussed in more detail below, a cover 18 provides a pressure vessel around the materials that actually perform the water purification and is removably attached to the body. The cover, which is typically threaded and made from plastic, includes several ridges 20 that provide gripping surfaces that ease attachment of the cover to the body.

The body includes an inlet port 22 to which is connected a threaded hose connector 24, and an outlet port 26 to which is connected a threaded hose connector 28. In use, hose connector 24 is typically connected to the output hose of a filter, while hose connector 28 is typically connected, through a hose, to a swimming pool. Thus, water from the pool circulates through the filter and the water purifier, in that order, before returning to the pool. The water purifier is placed after the filter so that any debris in the water are filtered out before the water enters the water purifier.

Figure 3:
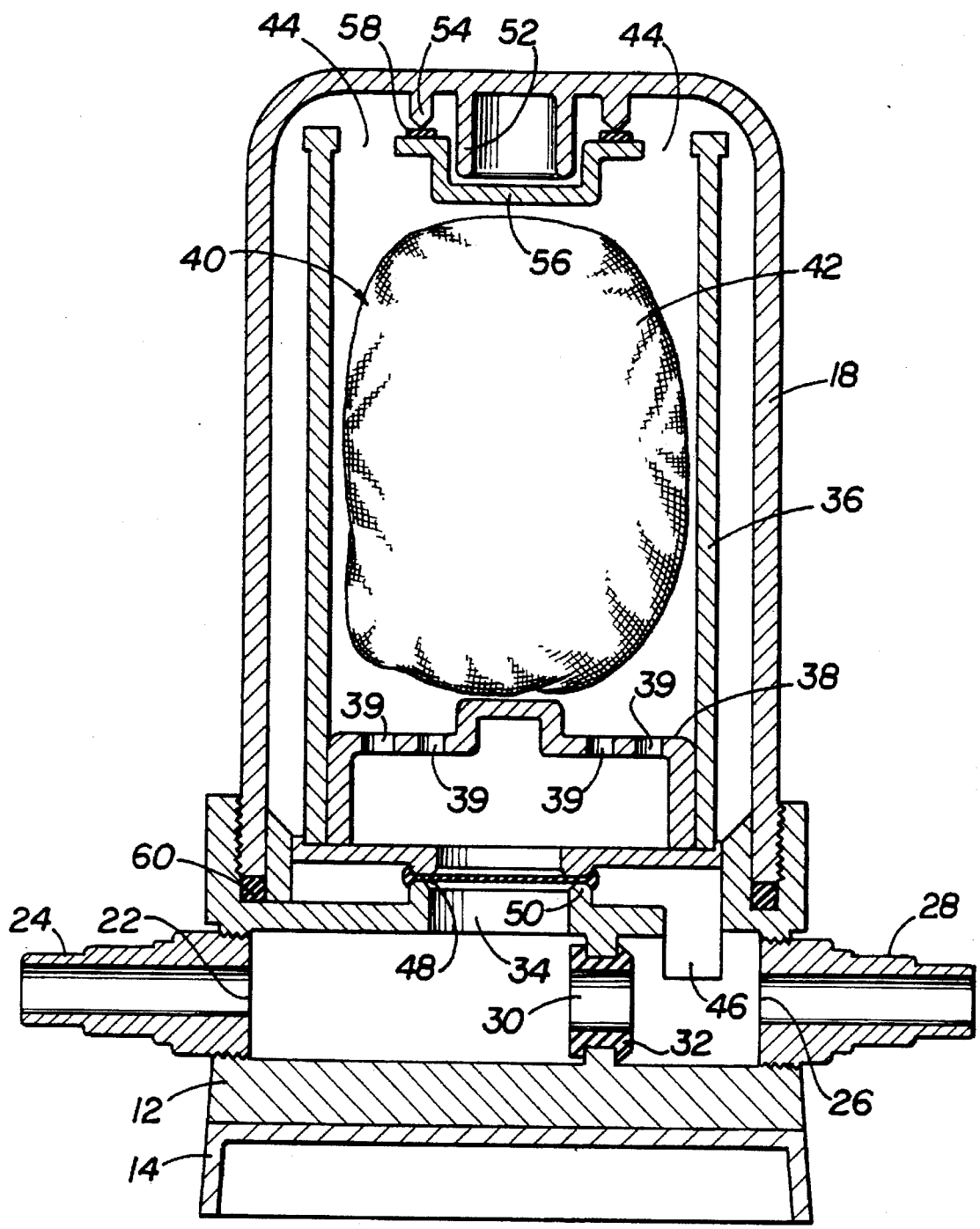
FIG. 3 is a cutaway side view of the water purifier of FIG. 2, taken along line 3—3 of FIG. 2.

Referring to FIG. 3, water entering inlet port 22 flows to outlet port 26 along a first path and a second path. Water flowing along the first path remains in body 12, and passes through a constricted region 30 that has a smaller cross sectional area than the cross sectional area of the inlet port. This constricted region causes a pressure increase in the water flowing along the first path, and thereby ensures that water will also flow along the second path. As necessary to ensure proper flow through the water purifier, the cross sectional area of the constricted region can be adjusted by removing a flow regulator 32 that is positioned in the constricted region and further reduces the cross sectional area of the constricted region.

Water flowing along the second path passes through an opening 34 in the top of body 12, and into a purification cartridge 36 positioned within cover 18. A diffuser 38, including a number of holes 39, is positioned in the purification cartridge and reduces the velocity of the water before the water contacts a mesh bag 40 that contains purification material 42. (The velocity in the purification cartridge, as well as the pressure, is also reduced because the purification cartridge has a substantially larger diameter than the opening 34.) As discussed below, the purification material is typically a silver catalyst that kills bacteria and other microorganisms in the water. After passing through the purification material, the water flows out of the purification cartridge through vents 44 in the top of the purification cartridge. The water then flows around the exterior of the purification cartridge before flowing into the outlet port through a duct 46.

A high pressure seal formed by a gasket 48 on the purification cartridge and an annular edge 50 on the top of body 12 ensures that water flowing through opening 34 will pass through the purification cartridge. The annular edge engages the gasket when threaded cover 18 is screwed onto the body. The cover includes an annular extension 52 and an annular edge 54 that, respectively, engage an annular depression 56 and a gasket 58 on the purification cartridge to secure the purification cartridge in place and thereby ensure that the seal between gasket 48 and annular edge 50 will be properly formed and maintained. An o-ring 60 forms a seal between the cover and the body.

Water purifier 10 can treat water entering the inlet port at rates as low as 25 gallons per minute (with the flow regulator 32 in place) and as high as 80 gallons per minute (with the flow regulator removed). Typically, to ensure sufficient flow along the second path, the water purifier is operated with the flow regulator in place. The flow regulator is removed when a pressure increase caused by the water purifier, as measured by a pressure gauge on the filter, exceeds three pounds per square inch. Removing the flow regulator prevents excessive flow along the second path, which could result in premature depletion of purification material 42.

Under normal operating conditions, the water purifier can treat between 5,000 and 20,000 gallons of water effectively. Due to depletion of the purification material, the purification cartridge must be replaced after operating for a season (five to six months). Water purifier 10 is fourteen and a half inches tall, eight inches wide, and about eleven inches deep. With the purification cartridge in place, the water purifier weighs about ten pounds.

Figure 4:
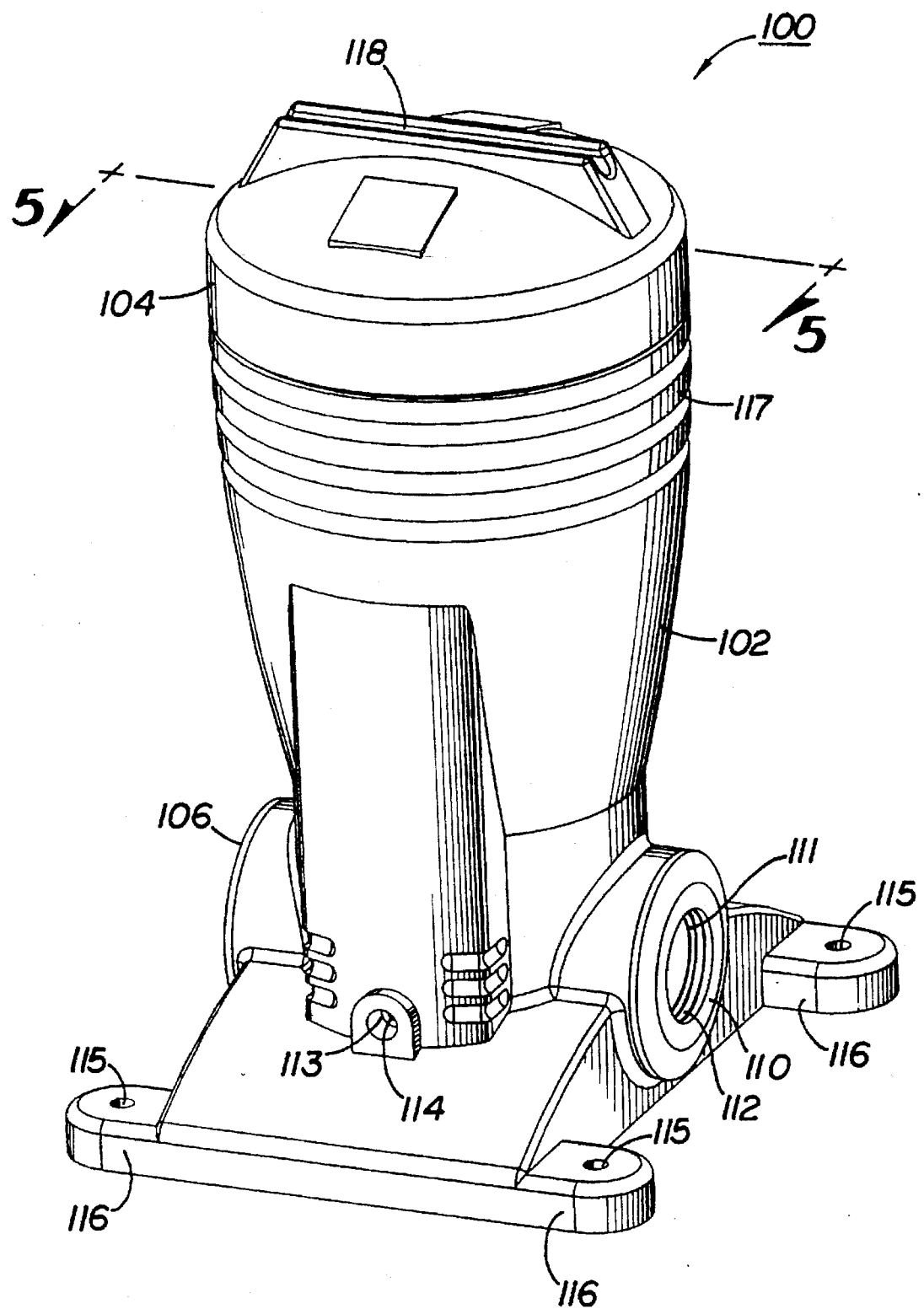
FIG. 4 is a perspective view of a second water purifier.
Figure 5:
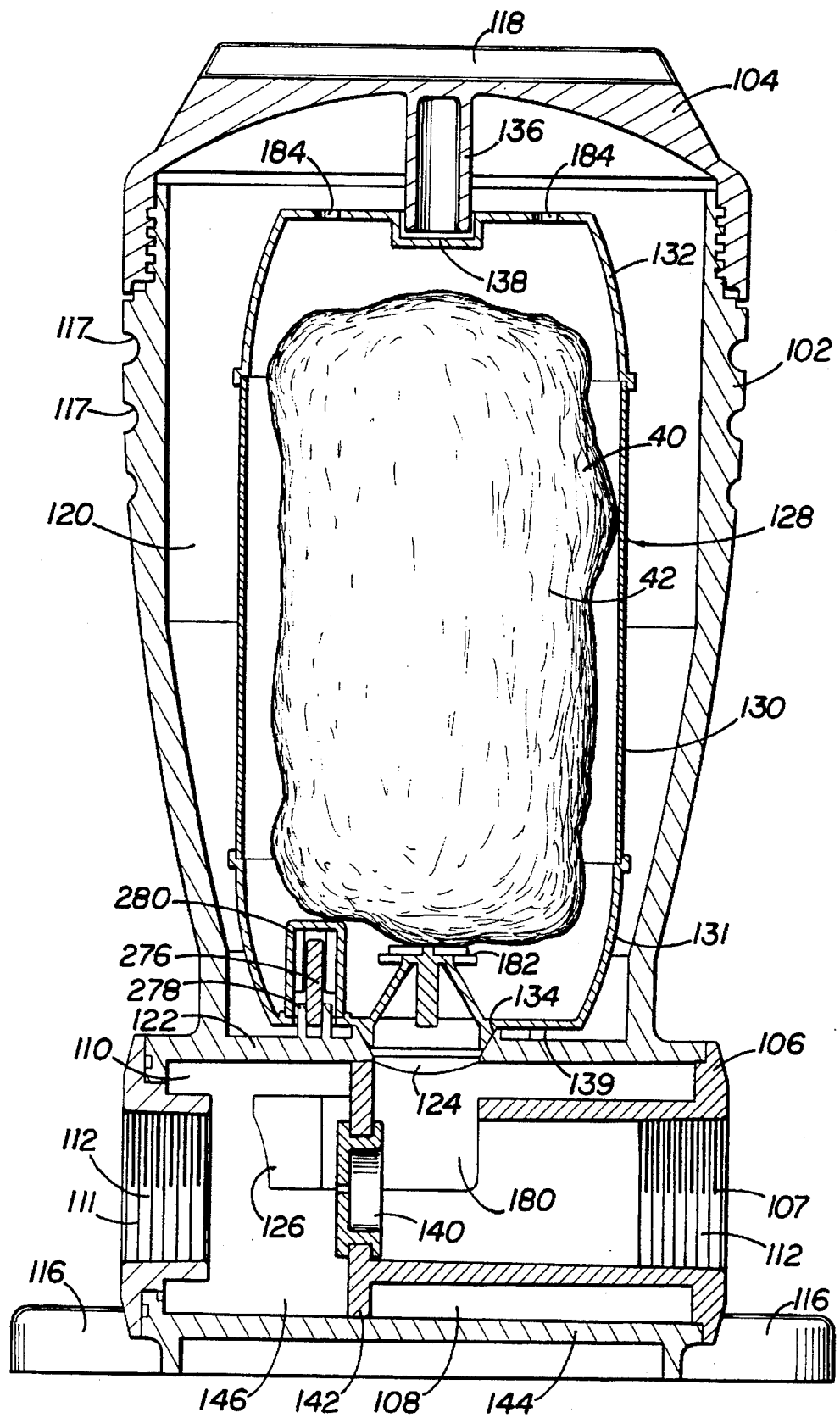
FIG. 5 is a cutaway side view of the water purifier of FIG. 4, taken along line 5—5 of FIG. 4.

Referring to FIGS. 4 and 5, in another embodiment, a water purifier 100 includes a molded polypropylene housing 102 and a removable cover 104. An inlet port 106 defines an opening 107 through which water enters the housing, and is positioned in a first end of a bottom chamber 108 of housing 102. Similarly, an outlet port 110 defines an opening 111 through which water exits the housing, and is positioned in a second end of bottom chamber 108. The interior walls of openings 107 and 111 include threads 112 that permit attachment of hose connectors such as threaded hose connector 24 (see FIG. 1).

The housing 102 also includes a drain port 113 that permits the housing to be drained when, for example, the swimming pool to which water purifier 100 is attached is shut down for the winter. The housing may be drained through the drain port by loosening a screw 114 positioned within the drain port. The drain port is positioned to ensure that at least half of the water in bottom chamber 108 may be drained, and to thereby ensure that the housing will not be damaged by expansion of ice within the bottom chamber 108 or elsewhere in the housing.

A mounting hole 115 is located on each of four extensions 116 at the corners of housing 102 to permit the water purifier to be rigidly secured to a solid, stable base. To permit water purifier 100 to be easily gripped while it is being secured, housing 102 includes a number of grooves 117.

The interior of cover 104 includes threads for engagement with threads on the exterior of the housing 102. To ease attachment and removal, the cover includes a groove 118 in which the blade of a screwdriver or similar tool may be positioned to provide leverage for tightening or loosening the cover.

Housing 102 includes two chambers: a bottom chamber 108 and a top chamber 120. Bottom chamber 108 has a generally cylindrical shape with a horizontally oriented central axis. Top chamber 120, which has a generally cylindrical shape with a vertically oriented central axis, tapers from a large radius at its top to a smaller radius where it joins bottom chamber 108. A wall 122 between the top and bottom chambers includes two openings: a first opening 124 that is positioned in the center of the bottom of chamber 120, and a second opening 126 that is positioned in the side of bottom chamber 108, above the central axis of bottom chamber 108 and between the first opening 124 and opening 111. Opening 124 has chamfered edges, with the radius of opening 124 decreasing from top chamber 120 to bottom chamber 108.

A cartridge 128 containing a mesh bag 40 of purification material 42 is positioned in top chamber 120. Cartridge 128 is comprised of a central cylinder 130, a bottom end cap 131 and a top end cap 132. Cartridge 128 is held in place by interference relationships between opening 124 and a chamfered extension 134 from bottom end cap 131, and between an extension 136 from the bottom of cover 104 and an indentation 138 in top end cap 132. When the cover is properly secured against the housing, the extension 136 presses down on the cartridge 128 and forces the chamfered extension 134 into the chamfered opening 124 so that a high pressure seal is formed between extension 134 and opening 124.

As with water purifier 10, water entering opening 107 of water purifier 100 may flow along either a first path in which the water does not contact the purification material 42 and is therefore left untreated or a second path in which the water is treated through contact with the purification material 42.

Water flowing along the first path passes through a flow regulator 140 that is positioned in a circular end piece 142 of inlet port 106. Flow regulator 140 and Circular end piece 142 divide bottom chamber 108 into a first portion 144 and a second portion 146, and are positioned so that opening 124 is located in first portion 144 and opening 126 is located in second portion 146.

Flow regulator 140 presents a restricted cross-sectional area through which water may flow, and results in a pressure drop from the first portion 144 of bottom chamber 108 to the second portion 146 of bottom chamber 108. This pressure drop forces water to flow along the second path, which is connected to chamber 108 through openings 124 and 126.

The flow regulator 140 ensures that the rate at which water flows along the second path through the cartridge 118 remains within an acceptable range (typically from 10 to 20 gallons per minute). A pump to which water purifier 100 may be attached, such as a pump used in an above-ground swimming pool, is fairly unregulated and may produce flow rates that vary within a range from 25 to 55 gallons per minute. Flow regulator 140 controls the flow rate through the cartridge by increasing the proportion of water that flows along the first path as the flow rate through the water purifier increases.

Flow regulator 140 is a mechanically simple device that is configured to present a varying cross-sectional area through which water may flow. As increased flow rates through the water purifier result in increased water pressure against the flow regulator, portions of the flow regulator bend or otherwise move to increase the cross-sectional area of the opening and to thereby permit a larger portion of the water to flow along the first path through the flow regulator.

Figure 6A:
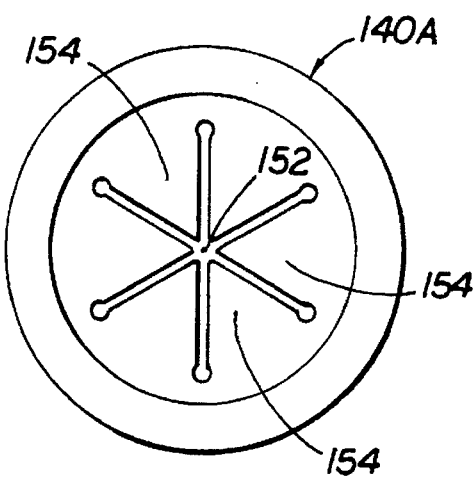
FIGS. 6A–6F are front views of flow regulators.

With reference to FIGS. 6A–6F, flow regulator 140 is typically implemented using a circular piece of silicone rubber or a similarly flexible material that has been cut or Otherwise shaped to produce the desired configuration. As illustrated in FIG. 6A, flow regulator 140A includes an opening 152 that is defined by six wedges 154. Incident water pressure bends wedges 154, with the degree to which wedges 154 are bent varying with the water pressure (i.e., the degree to which the wedges are bent increases with increasing water pressure and decreases with decreasing water pressure). Thus, the cross-sectional area through which water may flow along the first path increases with increasing water pressure and decreases with decreasing water pressure.

Figure 6B:
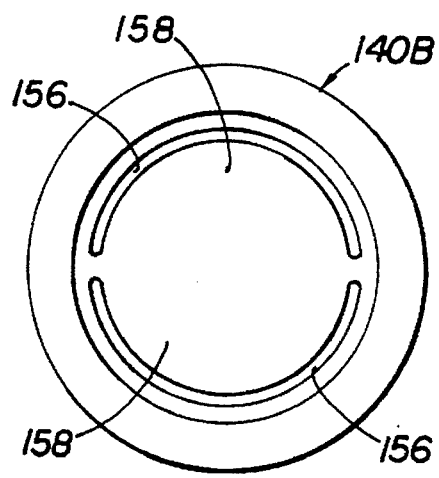

As illustrated in FIG. 6B, flow regulator 140B includes openings 156 that are defined by two semi-circular flaps 158. Like wedges 154, the degree to which the flaps are bent varies with incident water pressure.

Figure 6C:
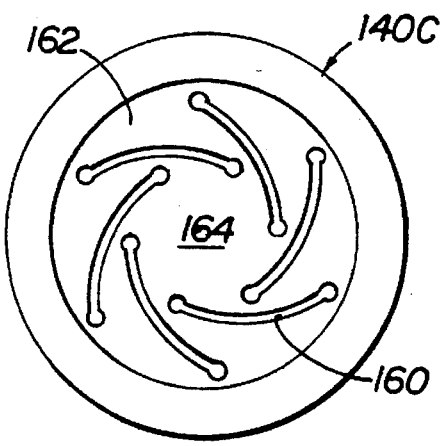

As illustrated in FIG. 6C, flow regulator 140C includes six slits 160 that are formed as clockwise arcs from an outer region 162 to an inner region 164. As water pressure increases, flow regulator 140C takes on a cone shaped configuration in which inner region 164 is rotated in a counter-clockwise direction and the width of slits 160 is increased.

Figure 6D:
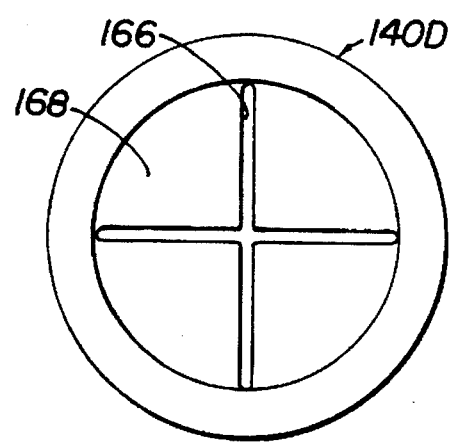

As illustrated in FIG. 6D, flow regulator 140D includes an opening 166 that is defined by four wedges 168. The thickness of each wedge varies from the thickness of each of the other wedges so that each wedge has a different compliance. Due to their differing compliances, incident water pressure bends each wedge 168 to a different degree.

Figure 6E:
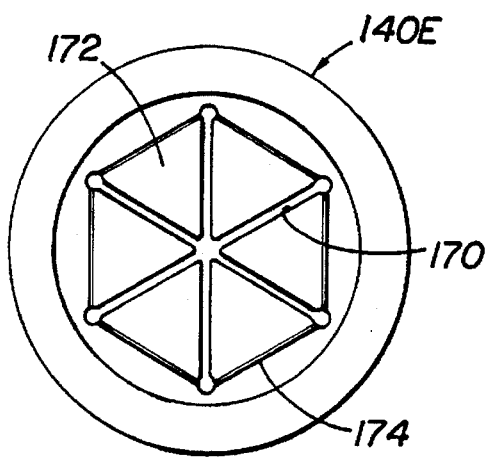

As illustrated in FIG. 6E, flow regulator 140E includes an opening 170 that is defined by six wedges 172. Scoring 174 along the base of each wedge increases the compliance of the wedge and causes the base to act as a hinge (i.e., the wedge tends to bend along the base rather than along the entire length of the wedge). The depth of the scoring 174 varies from wedge to wedge so that the compliances of the wedges differ.

Figure 6F:
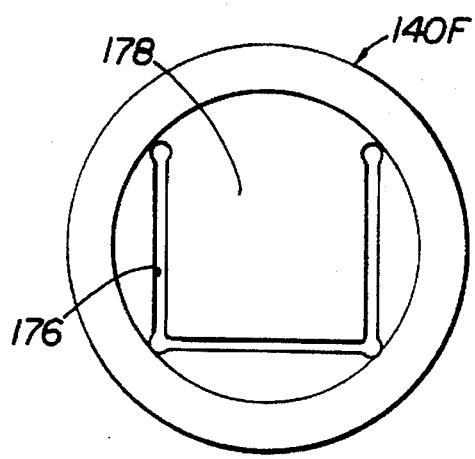

Finally, as illustrated in FIG. 6F, flow regulator 140F includes a single opening 176 that defines a rectangular flap 178. Incident water pressure bends the flap and thereby increases the size of the opening.

Referring again to FIG. 5, water flowing along the second path passes through a recess 180 in the inlet port 106 and enters the first portion 144 of bottom chamber 108. From chamber 108, the water flows through opening 124 and into the cartridge 128. As the water enters the cartridge, it strikes a diffuser 182 that reduces the velocity of the water. From the diffuser, the water flows up through the mesh bag 40, where the water is treated by contact with the purification material 42 contained therein.

After passing through the mesh bag, the treated water flows out of the cartridge through openings 184 in the top of end cap 132. The treated water then flows down around the cartridge in top chamber 120 and into the second portion 146 of bottom chamber 108 through opening 126. In chamber 108, the treated water combines with untreated water that has traveled along the first path through flow regulator 140, and the combined water flows out of the water purifier through opening 111 in outlet port 110.

Figure 7:
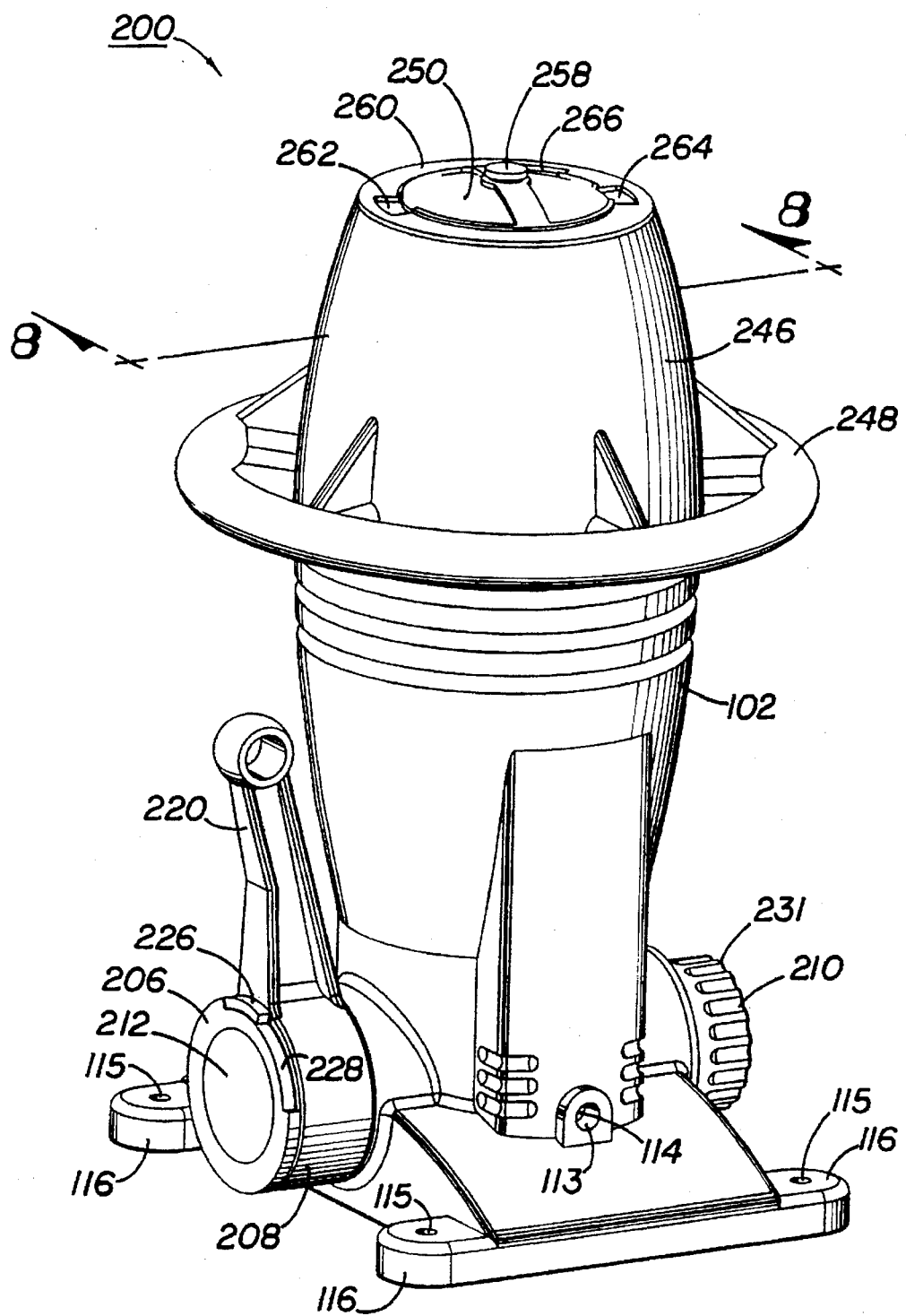
FIG. 7 is a perspective view of a third water purifier.
Figure 8:
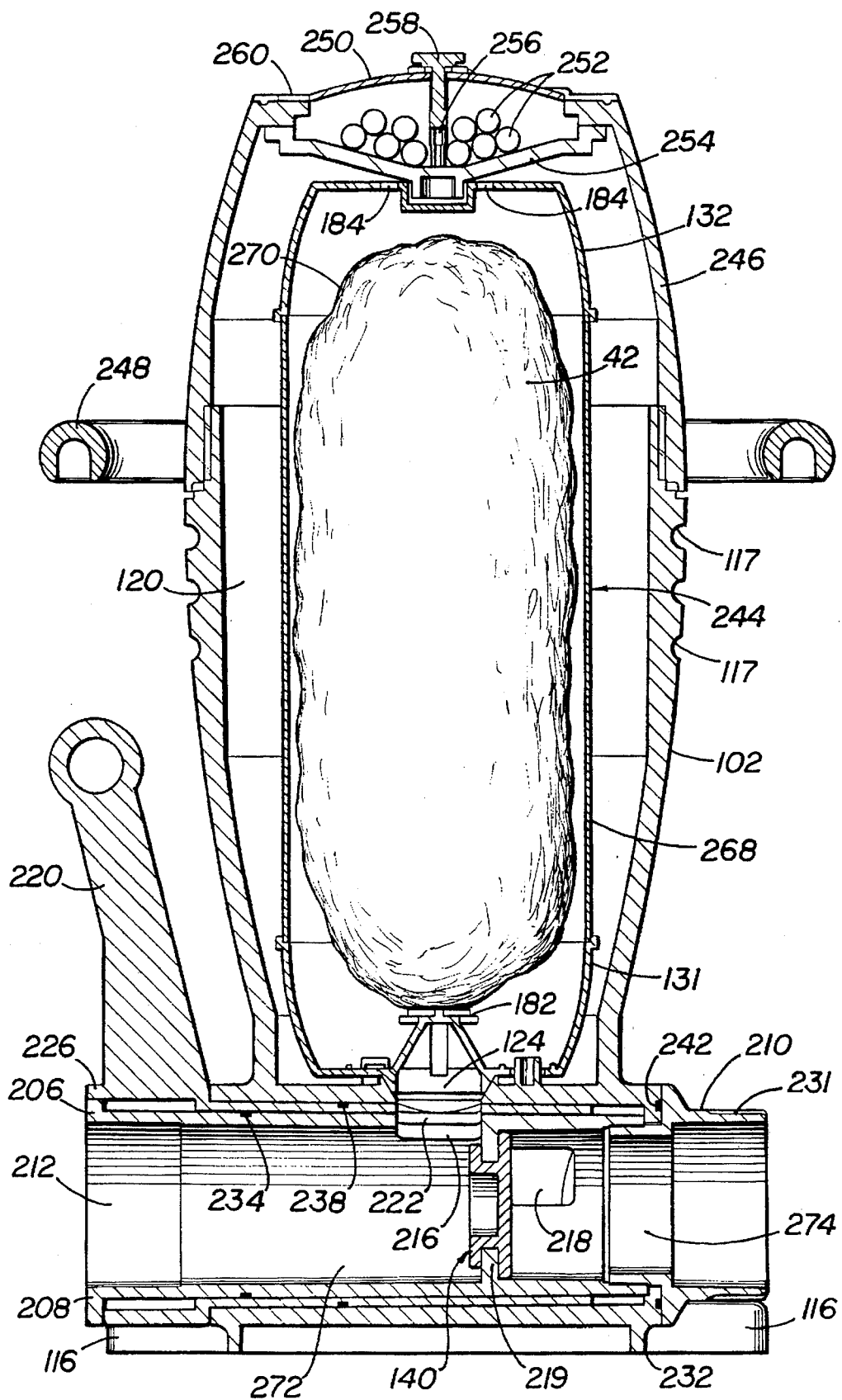
FIG. 8 is a cutaway side view of the water purifier of FIG. 7, taken along line 8—8 of FIG. 7.
Figure 9:
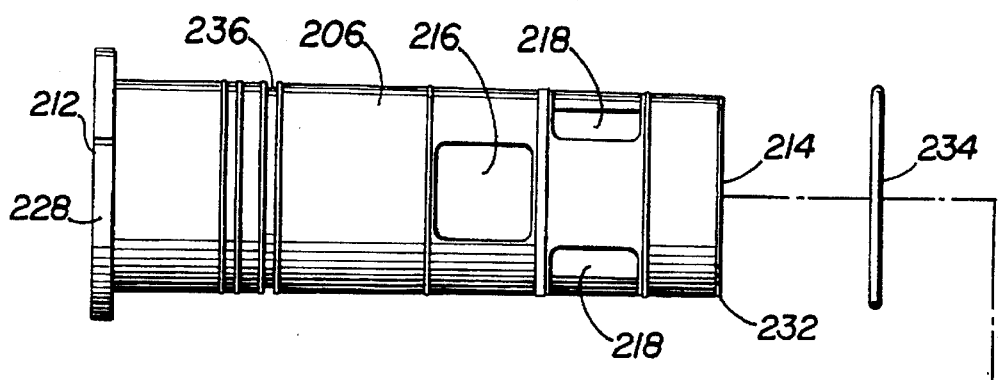
FIG. 9 is an exploded view of a shutoff valve of the water purifier of FIG. 7.
Figure 9:
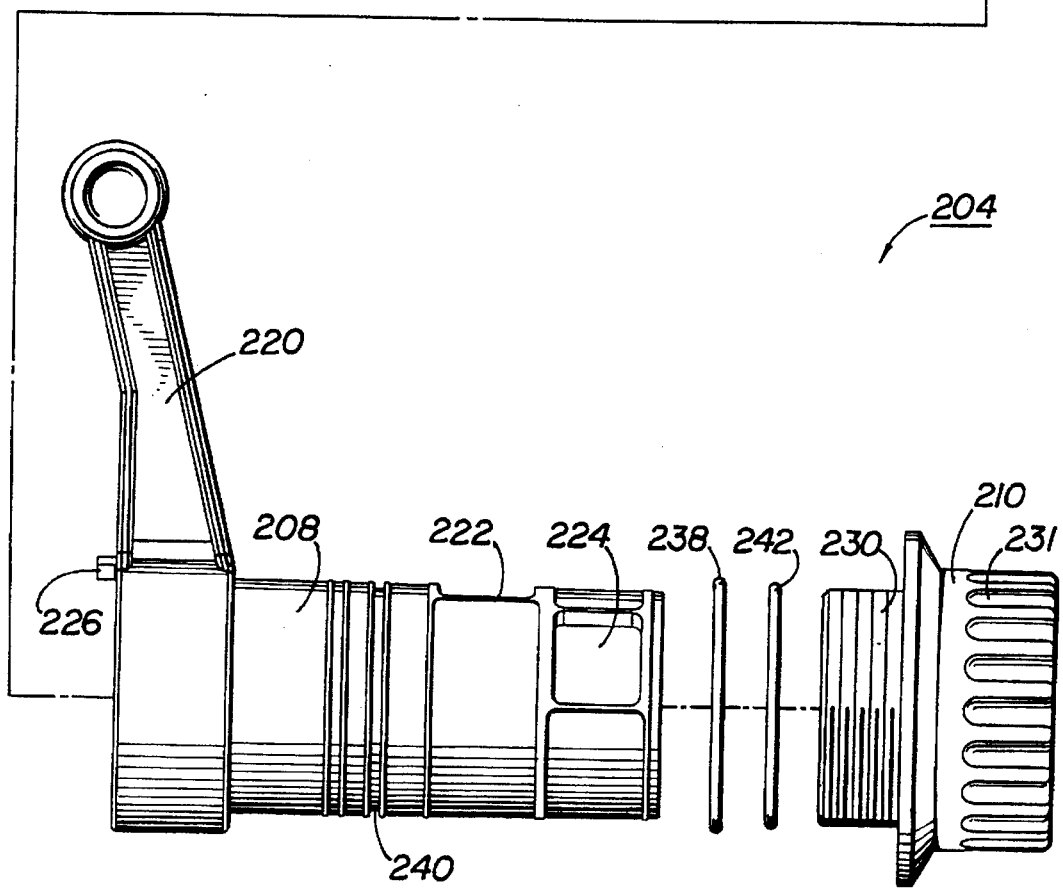
Figure 10:
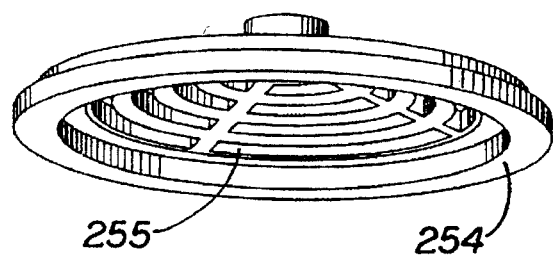
FIG. 10 is a perspective view of an indicator retainer of the water purifier of FIG. 7.
Figure 11:
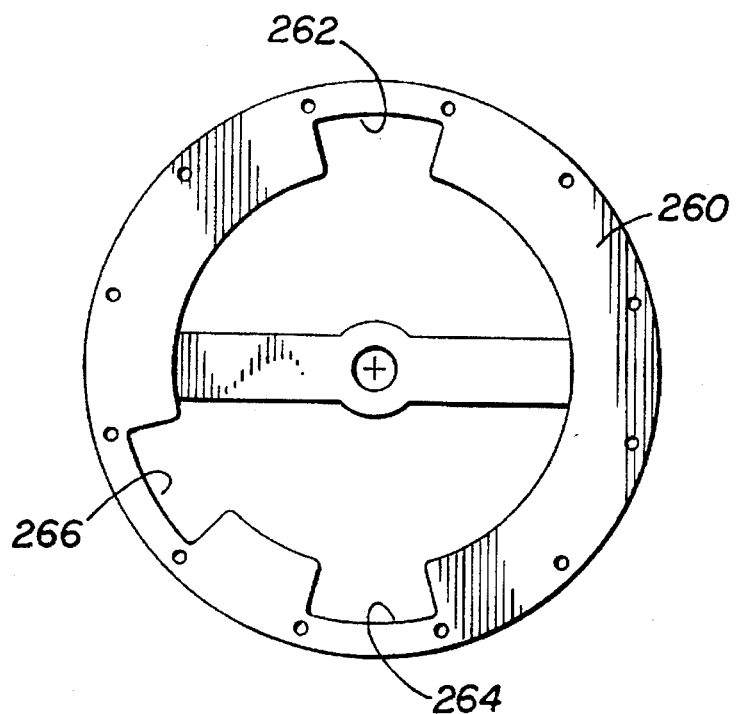
FIG. 11 is a top view of a life indicator ring of the water purifier of FIG. 7.
Figure 12:
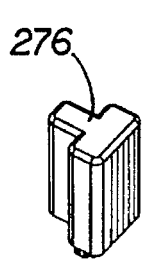
FIGS. 12 and 13 are perspective views of a key and key socket of the water purifier of FIG. 4.
Figure 13:
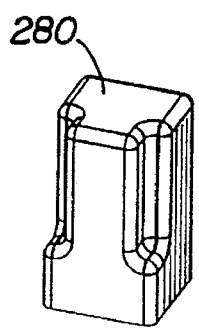

Referring to FIGS. 7–9, in another embodiment, a water purifier 200 includes a molded polypropylene housing 102 that is identical to the housing of water purifier 100. In water purifier 200, inlet port 106 and outlet port 110 (FIGS. 4 and 5) are replaced by a shutoff valve 204 that includes an inner sleeve 206, an outer sleeve 208 and an end piece 210.

Inner sleeve 206, which is illustrated by a top view in FIG. 9, has a generally cylindrical shape with an open input end 212 and an open output end 214. An opening 216 is located on the top of inner sleeve 206 in a cylindrical segment of inner sleeve 206 that is aligned with opening 124 in housing 102. Two openings 218 are located on the sides of inner sleeve 206 in a cylindrical segment of inner sleeve 206 that is aligned with opening 126 in housing 102. Openings 218 are sized so that their combined area is approximately equal to the area of opening 216, and are positioned on the sides of inner sleeve 206 to permit inner sleeve 206 to be drained via drain port 112. A flow regulator 140 is positioned in a constricted region 219 between the cylindrical segment corresponding to opening 216 and the cylindrical segment corresponding to openings 218.

Outer sleeve 208, which is illustrated by a side view in FIG. 9, has a generally cylindrical shape with a vertical handle 220 at its input end. Outer sleeve 208 includes an opening 222 positioned identically to opening 216 on inner sleeve 206, and two openings 224 positioned identically to openings 218 on inner sleeve 206. Thus, when outer sleeve 208 is positioned with handle 220 vertically oriented, water freely flows out of inner sleeve 206 through openings 216 and 222 and into inner sleeve 206 through openings 218 and 224. When outer sleeve 208 is rotated so that handle 220 is horizontally oriented, only minimal amounts of water are permitted to flow through openings 216 and 218. Because water is not prevented entirely from flowing through openings 218, drain port 212 will drain water from inner sleeve 206 even when handle 220 is horizontally oriented. An extension 226 on outer sleeve 208 is positioned in a channel 228 on inner sleeve 206 to limit the range of rotation of outer sleeve 208 to about ninety degrees.

Inner sleeve 206 and outer sleeve 208 are positioned in one end of bottom chamber 108, and end piece 210 is positioned in the other end of bottom chamber 108. Inner sleeve 206 and end piece 210 are connected to each other to retain valve 204 in bottom chamber 108. Typically, inner sleeve 206 and end piece 210 are threaded, with inner sleeve 206 having threads (not shown) on the inner surface of output end 214 and end piece 210 having threads 230 on its outer surface. To ease attachment of inner sleeve 206 to end piece 210, end piece 210 includes gripping contours 231 around its circumference. Inner sleeve 206 is maintained in a fixed angular position relative to bottom chamber 108 by a semicircular extension 232 on the output end 214 of inner sleeve 206. Extension 232 matches a groove in the bottom chamber 108 and is held in place by interaction with the groove.

Leakage from valve 204 is prevented by three o-rings. A first o-ring 234 is positioned in a groove 236 on the circumference of inner sleeve 206 to prevent water from leaking out of water purifier 200 from between inner sleeve 206 and outer sleeve 208. A second o-ring 238 is positioned in a groove 240 on the circumference of outer sleeve 208 to prevent water from leaking out of water purifier 200 from between outer sleeve 208 and housing 102. Finally, a third o-ring 242 is positioned between end piece 210 and housing 102 to prevent water from leaking out of water purifier 200 from between end piece 210 and housing 102.

Generally, inner sleeve 206 and end piece 210 are made from polyvinyl chloride ("PVC") to permit these pieces to be glued to PVC plumbing such as is used in inground swimming pools. Typically, outer sleeve 208 is made from polypropylene.

Water purifier 200 is typically used for treating the water of an inground swimming pool, while water purifier 100 is typically used for treating the water of an above ground swimming pool. Because inground swimming pools typically have a larger capacity the above ground swimming pools, water purifier 200 includes a larger cartridge 244 than the cartridge 128 of water purifier 100. To accommodate cartridge 244, water purifier 200 includes a cover 246 that is much larger than cover 104 of water purifier 100. Cover 246 includes around its circumference a handle 248 that permits cover 246 to be attached to and removed from housing 102 without use of a tool.

With reference also to FIG. 8, cover 246 includes a transparent top 250 that permits a visual determination of whether water is flowing through cartridge 244. Beneath top 250, a number of indicators, such as plastic spheroids 252, are positioned in an indicator retainer 254, which is itself positioned above cartridge 244. Water flowing out of cartridge 244 passes through openings 255 in indicator retainer 254 and causes spheroids 252 to move. Thus, movement of spheroids 252 is indicative of whether water is flowing through cartridge 244, and the degree to which spheroids 252 move is indicative of the rate at which water is flowing through cartridge 244. An air bleed valve 256 including a threaded bolt 258 is provided to remove air from the interior of cover 246, and to thereby maximize the effect of flowing water on spheroids 252.

Depletion of purification material 42 requires replacement of the purification cartridge from time to time. With reference also to FIG. 7, to provide an indicator that replacement is necessary, cover 246 includes an adjustable life indicator ring 260 that is secured by bolt 258. The names of the twelve months of the year are printed in equally spaced intervals around the top of cover 246. When a user inserts a new cartridge 244 in water purifier 200, the user loosens bolt 258 and adjusts life indicator ring 260 so that the month in which the cartridge is being inserted is visible in a first window 262. With life indicator ring 260 properly positioned, the month in which the cartridge should be replaced will be displayed in another window. The positions of the other windows may vary. For example, life indicator ring may include a second window 264 that is spaced six months after the first window and is labelled as the replacement month for large pools, and a third window 266 that is spaced eight months after the first window and is labelled as the replacement month for smaller pools.

Cartridge 244 includes a cylindrical section 268 that is taller than cylindrical section 130 of cartridge 128, and a mesh bag 270 of purification material 42 that is larger than mesh bag 40. Otherwise, cartridge 244 is identical to cartridge 128.

Like water purifier 100, water purifier 200 includes two flow paths. Water flowing along the first path passes through flow regulator 140 from a first chamber 272 of inner sleeve 206 to a second chamber 274 of inner sleeve 206. Water flowing along the second path passes from chamber 272 through openings 216, 222 and 124 and enters cartridge 244. The water then flows through the purification material 42 and flows out of cartridge 244 through openings 184. Water flowing through openings 184 passes through indicator retainer 254 and then flows down around cartridge 244 chamber 120. From chamber 120, water flows through openings 126, 224 and 218 and then enters chamber 274.

Referring to FIGS. 4, 5, 12 and 13, housing 102 and bottom end cap 131 include a key and socket mechanism to control whether a particular cartridge may be inserted into a particular water purifier. Housing 102 includes two t-shaped keys 276 that are positioned in channels 278 in the bottom of upper chamber 120, and end cap 131 includes two t-shaped sockets 280. (For ease of illustration and explanation, water purifier 200 is illustrated without keys 276 or sockets 280.) Because each key can be positioned in four possible orientations, use of two keys permits sixteen different key configurations. The key configurations can be used to identify up to sixteen housing or pool configurations based on criteria such as, for example, climate, pool capacity, water conditions, general level of use and pool or purifier manufacturer.

When an appropriately configured cartridge is positioned in housing 102, keys 276 interlock with sockets 280. In this case, the cartridge is positioned so that a seal is formed between opening 124 and extension 134 and the cover can be attached to the housing. When an inappropriately configured cartridge is positioned in housing 102, keys 276 do not interlock with sockets 280. In this case, the cartridge cannot be positioned so that a seal is formed between opening 124 and extension 134, and, provided that the cartridge is not undersized, the cover cannot be attached to the housing. Thus, keys 276 and sockets 280 prevent the use of improper cartridges in a water purifier.

In the preferred embodiments, the purification material is a silver catalyst that, when exposed to water in the presence of oxygen, forms an active oxidizer in the water and, in some instances, also releases silver ions into the water via an erosion process. The silver catalyst comprises an alumina matrix on which is deposited elemental silver in quantities of between approximately 0.1% and 5% by weight. The matrix with the silver thereon is heated to between approximately 750° C. and 1050° C. prior to use. The silver catalyst is described in more detail in U.S. Pat. No. 5,352,369, which is incorporated herein by reference.

Other embodiments are within the following claims.

What is claimed is:

1. A water purifier for killing bacteria in water located in a confined area, comprising:

a housing;

a water inlet on said housing that permits the water to enter the water purifier;

a water outlet on said housing that permits water to exit from the water purifier;

a purification unit that kills bacteria in the water;

a first fluid path located between said water inlet and said water outlet so that water flowing along said first fluid path flows from the water inlet to the water outlet without flowing through said purification unit, said first fluid path including a constricted region having a cross sectional area that is smaller than a cross sectional area of said water inlet;

a second fluid path located between said water inlet and said Water outlet, and including said purification unit so that water flowing along said second fluid path flows through said purification unit; and a self-adjusting flow regulator positioned within said constricted region to automatically modify the cross sectional area of said constricted region to maintain a rate of flow along said second fluid path within a predetermined range as water flows from said water inlet to said water outlet at a variable rate, wherein said self-adjusting flow regulator comprises a material that flexes under pressure.

2. The water purifier of claim 1, further comprising:

a housing that includes said water inlet and said water outlet and a cover attached to said housing, wherein said cover and said housing enclose said purification unit.

3. The water purifier of claim 2, wherein said cover is removable for replacement of said purification unit.

4. The water purifier of claim 3, wherein said purification unit comprises a cartridge containing a silver catalyst.

5. The water purifier of claim 3, further comprising an indicator in contact with water flowing along said second fluid path for indicating the rate at which water is flowing through the purification unit.

6. The water purifier of claim 5, wherein the cover includes a transparent top and the indicator includes one or more movable objects positioned beneath the transparent top, the movable objects being moved by water flowing through the purification unit.

7. The water purifier of claim 2, wherein the housing further comprises a shutoff valve that is configured to shut off flow through the second fluid path without reducing flow through the first fluid path.

8. The water purifier of claim 7, wherein the shutoff valve comprises:

an inner sleeve having a first opening through which water enters the second fluid path and a second opening through which water exits the second fluid path and an outer sleeve positioned around the inner sleeve and rotatable relative to the inner sleeve, wherein rotation of the outer sleeve relative to the inner sleeve shuts off flow along the second fluid path.

9. The water purifier of claim 1, wherein said purification unit comprises a cartridge having:

a first end having a hole therein through which water exits the cartridge, a second end having a hole therein through which water exits the cartridge, a central chamber between the first and second ends, a diffuser positioned between the hole in the first end and the central chamber, and a silver catalyst positioned in the central chamber so that water flowing through the cartridge flows through the silver catalyst as the water passes from the first end to the second end, wherein the diffuser reduces the velocity of the water entering the cartridge.

10. The water purifier of claim 2, wherein the housing includes a pair of keying mechanisms and the purification unit comprises a cartridge that includes a pair of sockets configured to interlock with the keying mechanisms.

11. The water purifier of claim 1, wherein said self-adjusting flow regulator positioned within said constricted region automatically modifies the cross sectional area of said constricted region to maintain a rate of flow along said second fluid path within the predetermined range from about 10 to 20 gallons per minute.

12. The water purifier of claim 11, wherein said self-adjusting flow regulator positioned within said constricted region automatically modifies the cross sectional area of said constricted region to maintain a rate of flow along said second fluid path within a predetermined range as water flows from said water inlet to said water outlet at a variable rate between about 25 to 55 gallons per minute.

13. A water purifier for killing bacteria in water located in a confined area, comprising:

a housing having a water inlet that permits the water to enter the water purifier and a water outlet that permits water to exit from the water purifier;

a cover that is removably attachable to said housing;

a purification unit removably positioned between said cover and said housing;

a first fluid path located between said water inlet and said water outlet so that water flowing along said first fluid path flows from the water inlet to the water outlet without flowing through said purification unit, said first fluid path including a constricted region having a cross sectional area that is smaller than a cross sectional area of said water inlet;

a second fluid path located between said water inlet and said water outlet, and including said purification unit so that water flowing along said second fluid path flows through said purification unit;

an indicator for indicating the level at which water is flowing through the purification unit;

a shutoff valve that is configured to shut off flow through the second fluid path without reducing flow through the first fluid path; and a self-adjusting flow regulator positioned within said constricted region, said self-adjusting flow regulator automatically modifying the cross sectional area of said constricted region to maintain a rate of flow along said second fluid path within a predetermined range as water flows from said water inlet to said water outlet at a variable rate, wherein said self-adjusting flow regulator comprises a material that flexes under pressure.

14. The water purifier of claim 1, wherein said self-adjusting flow regulator is a circular piece comprising a flexible material that includes an opening that is defined by six wedges that bend under pressure.

15. The water purifier of claim 13, wherein said self-adjusting flow regulator is a circular piece comprising a flexible material that includes an opening that is defined by six wedges that bend under pressure.

* * * * *